(12) United States Patent
Shaw et al.

(10) Patent No.: US 7,415,884 B1
(45) Date of Patent: *Aug. 26, 2008

(54) PRESSURE SENSOR WITH INTEGRATED BI-FUNCTIONAL HEATER AND METHODS OF USING

(75) Inventors: Greg Shaw, University Heights, OH (US); Troy Prince, Cleveland, OH (US); Joseph Snyder, Novelty, OH (US); Mike Willett, Akron, OH (US); Frederick Lisy, Euclid, OH (US)

(73) Assignee: Orbital Research Inc., Cleveland, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/820,403

(22) Filed: Jun. 19, 2007

Related U.S. Application Data

(63) Continuation of application No. 11/226,806, filed on Sep. 14, 2005, now Pat. No. 7,258,015, which is a continuation-in-part of application No. 10/666,156, filed on Sep. 19, 2003, now abandoned, which is a continuation-in-part of application No. 09/726,257, filed on Nov. 30, 2000, now Pat. No. 6,622,558.

(51) Int. Cl.
*G01B 5/30* (2006.01)
(52) U.S. Cl. ....................................... 73/708
(58) Field of Classification Search ........... 73/708, 73/753, 35.13, 432.1; 123/145
See application file for complete search history.

(56) References Cited

U.S. PATENT DOCUMENTS

| | | | |
|---|---|---|---|
| 4,518,444 A | 5/1985 | Albrecht et al. | |
| 4,631,094 A | 12/1986 | Simpson et al. | |
| 5,443,851 A | 8/1995 | Christie et al. | |
| 5,687,995 A | 11/1997 | Mori et al. | |
| 5,836,066 A | 11/1998 | Ingram | |
| 6,278,084 B1 | 8/2001 | Maynard | |
| 6,327,911 B1 | 12/2001 | Kurtz | |
| 6,363,792 B1 | 4/2002 | Kurtz et al. | |
| 6,523,415 B2 | 2/2003 | Kurtz et al. | |
| 6,530,282 B1 | 3/2003 | Kurtz et al. | |
| 6,622,558 B2 | 9/2003 | Huff et al. | |
| 7,017,417 B2 | 3/2006 | Daigle | |
| 2004/0206186 A1 | 10/2004 | Clark et al. | |
| 2005/0211214 A1 | 9/2005 | Tomita et al. | |

*Primary Examiner*—Andre J Allen
(74) *Attorney, Agent, or Firm*—Brian M. Kolkowski

(57) ABSTRACT

The present invention relates to a method of determining both pressures and temperatures in a high temperature environment. The present invention also relates to a method of determining temperatures about a pressure-sensing element using a bi-functional heater. In addition, the present invention preferably relates to a pressure sensor with the pressure-sensing element and a heating element both integrated into the sensor's packaging, preferably onto the diaphragm of the pressure sensor, and particularly to such a pressure sensor capable of operating at high or elevated temperatures, and even more particularly to such a pressure sensor wherein the heating element is capable of both heating, at least in part, the pressure-sensing element and monitoring the temperature of the application area. Preferably, the pressure-sensing element is formed from shape memory alloy (SMA) materials that can be used at high or elevated temperatures as a pressure sensor with high sensitivity.

20 Claims, 14 Drawing Sheets

TYPE I

TYPE II

PRESSURE SENSOR WITH INTEGRATED BI-FUNCTIONAL HEATER AND METHODS OF USING

CROSS REFERENCE TO RELATED APPLICATIONS

This application is a continuation of U.S. patent application Ser. No. 11/226,806, filed Sep. 14, 2005, now U.S. Pat. No. 7,258,015, which is a continuation-in-part of U.S. patent application Ser. No. 10/666,156 filed Sep. 19, 2003, now abandoned, which is a continuation-in-part of U.S. patent application Ser. No. 09/726,257 filed Nov. 30, 2000 that issued as U.S. Pat. No. 6,622,558.

BACKGROUND OF THE INVENTION

1. Field of the Invention

The present invention relates to a method of determining both pressures and temperatures in a high temperature environment. The present invention also relates to a method of determining temperatures about a pressure-sensing element using a bi-functional heater. In addition, the present invention preferably relates to a pressure sensor with the pressure-sensing element and a heating element both integrated into the sensor's packaging, preferably onto the diaphragm of the pressure sensor, and particularly to such a pressure sensor capable of operating at high or elevated temperatures, and even more particularly to such a pressure sensor wherein the heating element is capable of both heating, at least in part, the pressure-sensing element and monitoring the temperature of the application area. Preferably, the pressure-sensing element is formed from shape memory alloy (SMA) materials that can be used at high or elevated temperatures as a pressure sensor with high sensitivity.

2. Technical Background

In recent years there has been a need for high or elevated temperature pressure sensors for various applications including for use in harsh environments. In these harsh environments such as for use in engine cylinders and turbine engines, the pressure sensors are exposed to corrosive, oxidizing environments, which put high mechanical and thermal stresses on the sensors. Various approaches have been taken in order to protect the pressure sensors from these environmental conditions and to allow the sensor to remain operational over extended periods of time. These approaches include sealing the pressure sensor to shield it from the environment.

While sealing the sensor from the environment has helped create a more durable sensor, at high temperatures these sensing devices also suffer from the drawback of having too low of a gage factor resulting in sensors with larger diaphragms or sensors with signals that are difficult to measure. Gage factor is a measure of the sensitivity of the sensor. With too low of a gage factor, the sensitivity of the sensing element is reduced creating difficulty in reading the sensing element, or the diaphragm size has to be increased to make up for the reduced sensitivity. These sensors are typically manufactured by diffusing the sensing elements into a silicon diaphragm. With these types of sensors the gage factor significantly decreases with increasing temperature. Another drawback of these types of sensors is that the sensor is subjected to thermal variations at the point of application of the sensing element resulting in proportionally large variations in the signals received from the sensor. Both these drawbacks have been addressed by providing a means of cooling these types of sensors in order to maintain a higher level of sensitivity or gauge factor, and less variability. Cooling the sensor, however, is not desirable because of the cost, complexity and space requirements for such devices. Cooling the sensor further sets up a large temperature gradient between the sensing device and the application environment, causing additional problems.

What is needed is a pressure sensor with a high sensitivity at elevated temperatures that is constructed to reduce or eliminate thermal variations about the sensing element at the point of application. What is also needed is a pressure-sensing device that can further monitor application temperatures. It is therefore the object of the present invention to provide a high temperature pressure sensor without the drawbacks of the prior art. It is further an object of the present invention to provide a method of determining both pressures and temperatures of a high temperature environment. It is still further the object of the present invention to provide a high temperature pressure sensor with an integrated heating element on the diaphragm to help eliminate thermal variations at the point of application. It is still further an object of the present invention to provide a pressure sensor with an integrated bi-functional heating element. It is still further the object of the present invention to provide a pressure sensor with a smaller sized diaphragm with an integrated heating element on the diaphragm, which is also capable of reading higher pressures. It is still further the object of the present invention to provide a heating element, which can be used to measure the temperature of the application area, as well as to control itself. Finally, it is even still further the object of the present invention to provide a high temperature sensor made from a shape memory alloy (SMA) material with a heating element integrated into the packaging.

SUMMARY OF THE INVENTION

The present invention relates to a method of determining both pressures and temperatures in a high temperature environment. The present invention also relates to a method of determining temperatures about a pressure-sensing element using a bi-functional heater. In addition, the present invention preferably relates to a pressure sensor with the pressure-sensing element and a heating element both integrated into the sensor's packaging, preferably onto the diaphragm of the pressure sensor, and particularly to such a pressure sensor capable of operating at high or elevated temperatures, and even more particularly to such a pressure sensor wherein the heating element is capable of both heating, at least in part, the pressure-sensing element and monitoring the temperature of the application area. Preferably, the pressure-sensing element is formed from shape memory alloy (SMA) materials that can be used at high or elevated temperatures as a pressure sensor with high sensitivity.

The method of determining both pressures and temperatures in a high temperature environment, preferably, uses the pressure-sensing element to determine the pressure and the heating element not only to regulate the temperature of the pressure-sensing elements but to act as the temperature sensing element as well. The bi-functional heating element preferably is a resistive heating element. The present invention would also work as well with a bi-functional cooling element, such as a bimetal cooler and preferably a Peltier cooler. The method of the present invention can be used in various applications such as marine, aerodynamic, diesel, electric power generation, process control and the like where pressure and in some instances temperature are important characteristics of the application. The pressure and temperature sensing capabilities can then be used to control, adjust or regulate various input parameters of the application process such as the fuel/ air mixture, valve settings, injection timings or thermal regulators. The methods of the present invention allows for greater fuel efficiency as well as reduced emissions from combustion processes and greater efficiency and safety in chemical processes.

The heater element and pressure-sensing element of the pressure sensor are integrated into the pressure sensor packaging and preferably together onto the pressure sensor diaphragm. The heater element and the pressure-sensing element being configured to prevent short circuiting between the heating and pressure-sensing elements, and to allow the heater to maintain stable thermal characteristics of the pressure-sensing element, preferably similar to the application environment. Depending on the characteristics of the material, thickness and shape of the diaphragm, or the application, the heater can be positioned on the opposite side of the diaphragm from the sensing element, positioned adjacent to the sensing element, positioned above or below the sensing element (but separated by a dielectric layer) or in any other position relative to the sensing element that provides stable thermal characteristics during the application or use of the pressure sensor.

The heater element can be controlled to maintain a stable thermal environment, with temperatures at or around the application temperature, for the pressure-sensing element using another sensor to sense the temperature and a controller to receive signals from this sensor and adjust the electrical input into the heater element to achieve or maintain thermal stability about the pressure-sensing element. Alternatively, with the proper heater element having thermally sensitive resistive characteristics, the temperature at the heater element can be determined by the electrical requirement characteristics of the heater element to determine the temperature and thereby through a controller to maintain the thermal stability about the pressure-sensing element.

In a number of embodiments, the sensor of the present invention comprises a substrate material, a flexible diaphragm provided on the substrate material and a sensor member deposited on the flexible diaphragm. The sensor member or pressure-sensing element may be formed from a thin film SMA material and is capable of undergoing a phase transformation, such as from its austenite phase to its martensite phase, in response to a physical stimulus, such as strain, being applied thereto. During such a phase transformation, the electrical resistance of the thin film SMA material undergoes a substantial change. This change in electrical resistance can be correlated to a change in strain being applied to the thin film material. In this manner pressure can be measured. The present invention also provides a method for measuring a physical stimulus comprising the steps of providing a sensor comprising a thin film SMA material; measuring a physical property, such as the electrical resistance, of the thin film SMA material immediately before the material undergoes a phase transformation caused by the application of a physical stimulus thereto; applying a physical stimulus to the thin film SMA material causing the material to undergo a phase transformation; measuring a physical property, such as the electrical resistance, of the thin film SMA material immediately after the material undergoes a phase transformation; determining the difference in the value of the physical property, e.g., the electrical resistance, that occurs during the phase transformation; and utilizing the difference in the value of the physical property to determine the magnitude of the physical stimulus being applied to the thin film SMA material.

One embodiment of the present invention includes a method of determining both pressures and temperatures in an elevated pressure chamber comprising the steps of providing a pressure sensing element for an elevated temperature in which a pressure and a temperature are to be measured; providing a heating element in or about the elevated pressure chamber in which a pressure and temperature are to be measured; measuring the pressure of the elevated pressure chamber through the sensing element; and measuring or predicting the temperature of the elevated pressure chamber through the heating element.

In another embodiment, the present invention includes a method of determining both pressures and temperatures in an elevated pressure chamber comprising the steps of providing a sensing element for an elevated pressure chamber in which a pressure and a temperature are to be measured; providing a heating element in or about for the elevated pressure chamber in which a pressure and temperature are to be measured; heating the sensing element, at least in part, with the heating element; measuring the pressure of the elevated pressure chamber through the sensing element; and measuring or predicting the temperature of the elevated pressure chamber through the heating element.

In still another embodiment, the present invention includes a method of adjusting an engine comprising the steps of providing a sensing element for an engine chamber in which a pressure and a temperature are to be measured; providing a heating element for the engine chamber in which a pressure and temperature are to be measured; heating the sensing element, at least in part, with the heating element; measuring or estimating the pressure of the engine chamber through the sensing element; and adjusting parameters for the engine chamber based in part on the measured or estimated pressure.

In yet another embodiment, the present invention includes a method of controlling a temperature about a pressure-sensing element comprising the steps of providing a pressure-sensing element for an elevated temperature application in which a pressure is to be measured; providing a heating element with a power input; heating the pressure-sensing element, at least in part, with the heating element; determining or estimating the temperature of about the pressure-sensing element by measuring at least one electrical characteristic of the heating element; and adjusting the power input to the heating element in response to the measured electrical characteristic or characteristics of the heating element.

In yet another embodiment, the present invention includes a pressure sensor comprising a sensing element; a diaphragm having an upper and a lower surface; and a resistive heating element capable of working as a heating element and a thermistor.

In yet another embodiment, the present invention includes a pressure sensor comprising a sensing element; a diaphragm having an upper and a lower surface; and a resistive heating element wherein the resistive heating element maintains the temperature of the sensing element at or above the operating temperature range of the pressure sensor and is used to measure the operating temperature of the pressure sensor.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodi-

DESCRIPTION OF THE PREFERRED EMBODIMENT

Figure 1:
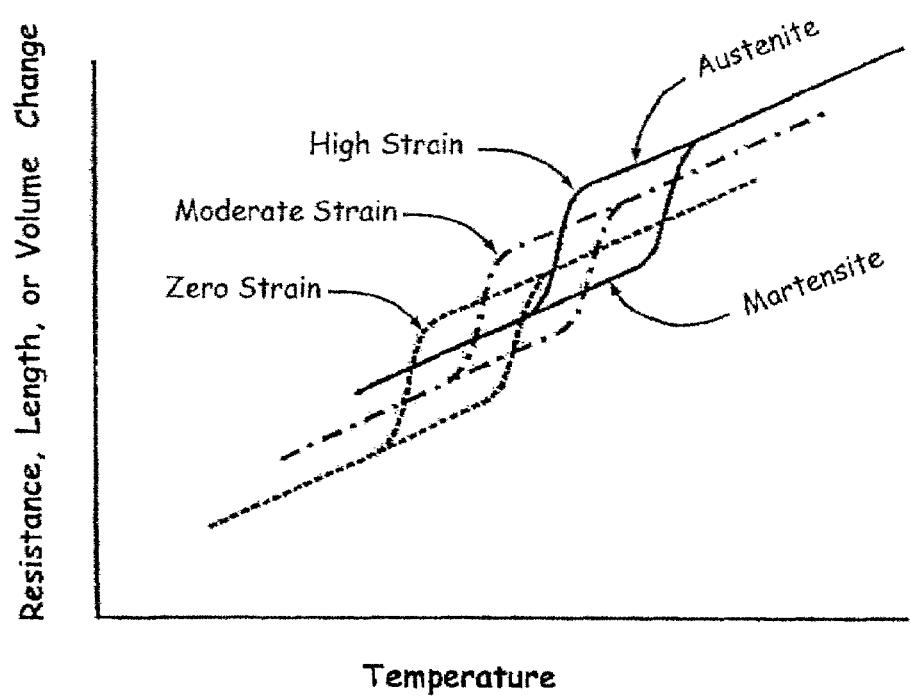
FIG. 1 is a hysteresis curve of Electrical Resistance or Length Change or Volume Change vs. Temperature for a hypothetical SMA material.

The present invention relates to a method of determining both pressures and temperatures in a high temperature environment. The present invention also relates to a method of determining temperatures about a pressure-sensing element using a bi-functional heater. In addition, the present invention preferably relates to a pressure sensor with the pressure-sensing element and a heating element both integrated into the sensor's packaging, preferably onto the diaphragm of the pressure sensor, and particularly to such a pressure sensor capable of operating at high or elevated temperatures, and even more particularly to such a pressure sensor wherein the heating element is capable of both heating, at least in part, the pressure-sensing element and monitoring the temperature of the application area. Preferably, the pressure-sensing element is formed from shape memory alloy (SMA) materials that can be used at high or elevated temperatures as a pressure sensor with high sensitivity.

The method of determining both pressures and temperatures in a high temperature environment, preferably, uses the pressure-sensing element to determine the pressure and the heating element not only to regulate the temperature of the pressure-sensing element but to act as the temperature sensing element as well. The bi-functional heating element preferably is a resistive heating element. The present invention would also work as well with a bi-functional cooling element, such as a bimetal cooler and preferably a Peltier cooler.

The method of the present invention can be used in various general applications including but not limited to marine, aerodynamic, diesel, electric power generation and the like where pressure and in some instances temperature are important characteristics of the application or process. These pressure sensors can specifically be used on test & measurement equipment, stationary and marine diesel, off-road diesels, over-the-road diesels, automotive (combustion) engines, aircraft turbojets (commercial and military), marine turbojets (commercial and military), fixed turbines for power generation, boilers and processing equipment, and the like. The pressure and temperature sensing capabilities can then be used, in most if not all of these applications; to control, adjust or regulate various input parameters of the application process such as the fuel/air mixture. The methods of the present invention further preferably allow for greater fuel efficiency as well as reduced emissions from these various processes.

Preferably, the pressure sensor measures or estimates the pressure in the application environment by measuring the amount of deflection of a diaphragm caused by a pressure in the chamber being measured. More preferably, this is done by placing a strain gauge on the diaphragm to accurately measure the deflection at the surface. More preferably, the strain gauge is made from a SMA material whose phase transformation temperature range is at or about the application temperature of the application in which the pressure sensor is to be used.

The pressure chamber referred to in various embodiments of the present invention can be for example a cylinder for a combustion or a diesel engine, a can for a turbine engine, a boiler or parts of a boiler, a chemical reaction vessel, a pressurized fluid vessel including various hydraulic systems, and the like. These examples are given by way of demonstration not limitation.

The temperature control or heating element can be fully integrated into the sensor packaging, or it can be a separate element that is thermally coupled to the pressure-sensing element. More preferably, the temperature control or heating element is at least partially integrated onto the diaphragm of the pressure sensor along with the pressure-sensing element. The temperature control or heating element is preferably a bi-functional heating or cooling element, and more preferably a bi-functional heating element. One of the functions of the heating or cooling element is to heat or cool the pressure-sensing element. The other function is to measure the temperature about the pressure-sensing element and/or to measure the application temperature.

The bi-functional heating and cooling element can measure these local temperatures in a number of ways known to those skilled in the art. One of these methods involves the heating element being a resistive heater. For a cooled sensor the methods are similar, but with a sign change. In this first method, where there is a heat flux into the sensor, the heating element is intermittently turned off and the substrate on which the heating element is mounted is allowed to come to thermal equilibrium with the surroundings. The resistance of the heating element is measured. This is compared to a look-up table or equation held in the processing part of the pressure sensor or controller used with the pressure sensor, and the temperature is identified as a function, ideally of linear resistance. In another method, the temperature of the pressure sensor is maintained at some constant, warmer than the application environment, such that small amounts of heat are transferred into the application environment. The amount of power that is required to maintain the temperature of the pressure sensor is a function of the thermal transfer characteristics and the temperature difference between the pressure sensor and the environment. Use of the bi-functional heating element in this mode requires knowledge of the thermal transfer paths and mechanisms of the pressure sensor. The power requirements can then be directly related to the temperature difference between the pressure sensor and the application environment.

In a number of embodiments, the present invention relates to a method and sensor to detect strain utilizing the strain-dependent electrical resistance effect of SMA materials near their phase transformation temperature. The strain can be produced by any external stimulus, such as mechanical vibration, pressure, force, stress or other strain inducing external input.

A number of embodiments of the present invention include a pressure sensor comprised of a substrate with an opening, and a flexible diaphragm held across the opening of the substrate. The substrate can be made from any material known to those skilled in the art. The opening of the substrate is important. If the opening is large it correspondingly requires a larger pressure-sensing device, and in the case of measurement of larger pressures a diaphragm with increased mechanical properties. If the opening is small, the sensitivity of the device suffers. Therefore with smaller devices, and therefore smaller openings, it is desirable to have pressure sensors with the highest possible gage factor (which is explained below). Preferably, the maximum dimension of the opening of the substrate across which the flexible diaphragm lies is less than about 1.0 mm, more preferably less than about 0.5 mm, and most preferably less than about 0.25 mm. The diaphragm, likewise, can also be made from any material known to those skilled in the art, provided it has a flexibility corresponding to the pressure and the pressure range that is desired to be measured. Preferably, the diaphragm is made from a material on which the sensor can be applied or deposited and a good bond can be formed. More preferably, the diaphragm is made from silicon. Preferably, the flexible diaphragm has a thickness less than about 350 um extending across the opening of the substrate, more preferably less than about 250 um, even more preferably less than about 225 um, still even more preferably less than about 150 um, and most preferably less than about 50 um.

The pressure sensor of the present invention preferably is capable of measuring a wide range of pressures, and for measuring fairly high pressures without premature failure. This is because while these pressure sensors can be used for any application known to those skilled in the art, many of those applications are in areas requiring the measurement of fairly high pressures. Two areas of prime application of these pressure sensors are for the measurement of pressures in turbine engines as well as the measurement of pressures in internal combustion engines. Because of this, preferably, the pressure sensor is capable of measuring pressures above 1000 psi; more preferably, above about 2000 psi; even more preferably above about 3000 psi; and most preferably above about 5000 psi without premature failure. Also preferably, the pressure sensor is capable of measuring pressures less than about 300 psi; more preferably, less than about 200 psi; even more preferably less than about 100 psi; and most preferably less than about 75 psi.

Referring now to FIG. 1, hysteresis curves of Electrical Resistance or Length Change or Volume Change vs. Temperature for a hypothetical SMA material is shown for three different levels of strain, i.e., zero strain, moderate strain, and high strain. In each instance, the bottom portion of each curve represents the material when in the martensite phase and the top portion of each curve represents the material when in the austenite phase. The portions of each curve interconnecting the bottom portion of the curve with the top portion of the curve represents a phase transformation, i.e., either from the martensite phase to the austenite phase or from the austenite phase to the martensite phase. As can be seen, each curve has a similar shape and as strain increases, the curves shift in a positive direction along the X and Y axes. Upon heating, the SMA material spontaneously transforms from the martensite phase to the austenite phase at the phase transformation temperature (the velocity of transformation is the acoustic velocity). The phase transformation temperature is a relatively narrow band of temperatures. Many of the physical properties of an SMA material, including electrical resistance, ductility, Young's Modulus, reflectivity, etc., undergo a substantial change in value during a phase transformation. The present invention relates to the large change in electrical resistance that occurs in SMA material during a phase transformation.

It has been found that when an SMA material is held at or near its phase transformation temperature, an application of strain to the material causes the material to undergo the phase transformation with a corresponding large change in the electrical resistance of the material. The amount of strain required to induce the transformation may be quite small, on the order of 0.1% or less. The figure of merit for strain gages is called the gage factor and is defined as the normalized change in electrical resistance divided by the change in strain (Gage Factor=G.F.=$((\Delta R/R)/\in)$, where R is the electrical resistance; $\Delta R$ is the change in the electrical resistance; and $\in$ is the strain. The gage factor for typical metal film strain gages is on the order of 2 to 5. Silicon and polycrystalline silicon piezoresistors have gage factors that vary from less than 1 to over 100 depending upon their orientation, doping level, crystalline perfection, and the temperature of application. However, this level of gage factor is quite difficult to achieve in practice. Furthermore, the high gage factor of silicon materials is lost when operated at elevated temperatures. The change in the electrical resistance of SMA material at its phase transformation temperature can, however, be on the order of 20% for a strain of 0.1%, thereby achieving a gage factor of nearly 200 ($\Delta R/R$=0.2 and $\in$=0.001; therefore, 0.2/0.001=200). Also, SMA materials can have phase transformation temperatures in excess of 550° C. and, therefore, can be utilized as highly sensitive strain sensors at elevated temperature. The present invention discloses a method and a sensor made from SMA material to utilize this effect.

Preferably, the pressure sensor of the present invention has a gage factor of at least about 35 at temperatures of at least about 37° C., more preferably a gage factor of at least about 40 at temperatures of at least about 37° C., and most preferably a gage factor of at least about 42 at temperatures of at least about 37° C. Preferably, the pressure sensor of the present invention has a gage factor of at least about 27 at temperatures of at least about 200° C., more preferably a gage factor of at least about 32 at temperatures of at least about 200° C., and most preferably a gage factor of at least about 37 at temperatures of at least about 200° C. Preferably, the pressure sensor of the present invention has a gage factor of at least about 22 at temperatures of at least about 400° C., more preferably a gage factor of at least about 30 at temperatures of at least about 400° C., and most preferably a gage factor of at least about 35 at temperatures of at least about 400° C. Preferably, the pressure sensor of the present invention has a gage factor of at least about 20 at temperatures of at least about 500° C., more preferably a gage factor of at least about 30 at temperatures of at least about 500° C., and most preferably a gage factor of at least about 35 at temperatures of at least about 500° C. Preferably, the pressure sensor of the present invention has a gage factor of at least about 16 at temperatures of at least about 550° C., more preferably a gage factor of at least about 25 at temperatures of at least about 550° C., even more preferably a gage factor of at least about 30 at temperatures of at least about 550° C. and most preferably a gage factor of at least about 35 at temperatures of at least about 550° C.

In another embodiment of the present invention, preferably the pressure sensor has a heating element capable of heating the sensing element, whether it be a strain gage or some other type of element, to at least about the application temperature (and in the case of SMA materials to the transformation temperature). This allows for stabilization of the sensing element in applications such as engine applications where the temperature varies. This also provides a method of determining pressures in an engine comprising the steps of providing a sensing element for a chamber having a given operating temperature for the chamber in which a pressure is to be measured, heating the sensing element to at least about the operating temperature of the chamber and measuring the pressure of the chamber through the sensing element. Preferably, the heating element heats the sensing element to a temperature at or above the highest application temperature of the sensing element, if the temperature is cyclical at or near the maximum application temperature. Several embodiments of the heating element are more specifically described later in the application in reference to FIGS. 7, 8, 9, 10, 11 and 12.

The heater element and pressure-sensing element of the pressure sensor may be integrated together onto the pressure sensor diaphragm; the heater element and the pressure-sensing element being configured to prevent short circuiting between the heating and pressure-sensing elements, and to allow the heater to maintain stable thermal characteristics of the pressure-sensing element, preferably similar to the application environment. Depending on the characteristics of the material, thickness and shape of the diaphragm, or the application, the heater can be positioned on the opposite side of the diaphragm from the sensing element, positioned adjacent to the sensing element, positioned above or below the sensing element (but separated by a dielectric layer) or in any other position relative to the sensing element that provides stable thermal characteristics during the application or use of the pressure sensor.

The heater element can be controlled to maintain a stable thermal environment, with temperatures at or around the application temperature, for the pressure-sensing element using another sensor to sense the temperature and a controller to receive signals from this sensor and adjust the electrical input into the heater element to achieve or maintain thermal stability about the pressure-sensing element. Alternatively, with the proper heater element having thermally sensitive resistive characteristics, the temperature at or about the heater element can be determined by the electrical requirement characteristics of the heater element to determine the temperature and thereby through a controller to maintain the thermal stability about the pressure-sensing element. Preferably, the heating element is a resistive heater. More preferably, the heating element is made in part from one or more of the following materials. For example, platinum, gold, and nichrome, which are stable materials at the application temperatures of the pressure sensor. In addition, non-metallic materials will also work such as polycrystalline silicon.

The SMA material of certain specific embodiments of the present invention can be, but is not limited to, binary and equal parts (atomic percent) of elements, binary and unequal parts of elements, or ternary or quaternary parts of various compositions of elements. These compositions may comprise elements such as a mixture of titanium and nickel (TiNi) or titanium, nickel and palladium (TiNiPd) although it can be appreciated by one having ordinary skill in the art that the present invention is not limited to SMA material comprised of the aforementioned elements. Variations in composition and alloying content affect the temperature at which a phase transformation occurs. For example, in a SMA material comprising TiNi having approximately 50% atomic weight of each element, a 1 to 2% change in the percentage of titanium to nickel shifts the phase transformation temperature from below 0 to over 90 C. Thus, the phase transformation temperature can be compositionally tailored by utilizing binary alloys and can be extended by using ternary alloys. An SMA material comprising TiNiPd can have a phase transformation temperature as high as 550 to 600 C depending upon the relative concentration of Pd to Ni. As Pd is substituted for Ni, the phase transformation temperature generally increases until the resulting compound is completely TiPd whereupon the phase transformation temperature is at its maximum.

Figure 2:
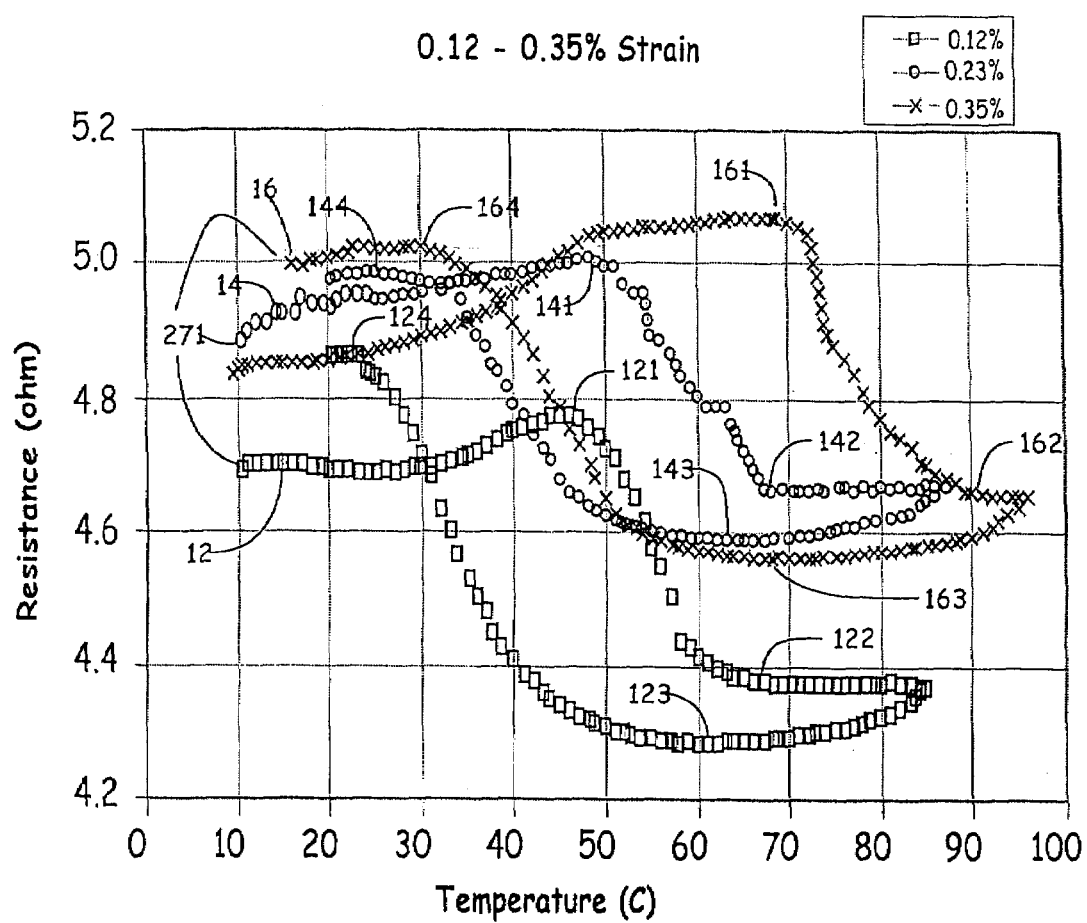
FIG. 2 is a graph of Electrical Resistance vs. Temperature and shows the hysteresis curve of a thin film SMA material under three different strain levels.

Referring now to FIG. 2, there is shown a graph of Electrical Resistance vs. Temperature illustrating the hysteresis curves of SMA material under strain levels of 0.12% 12, 0.23% 14 and 0.35% 16. Each hysteresis curve has an austenite start point 121, 141 and 161; an austenite finish point, 122, 142 and 162; a martensite start point 123, 143 and 163; and a martensite finish point 124, 144 and 164, defining individual hysteresis curves. As the temperature of the SMA material increases, it reaches the austenite start point 121, 141, 161 and the austenite phase transformation begins. The electrical resistance of the material decreases until it reaches its austenite finish point 122, 142, 162. As the temperature of the SMA material is then decreased, the material reaches its martensite start point 123, 143 and 163 and the martensite phase transformation begins. The electrical resistance of the material increases until the material reaches its martensite finish point 124, 134 and 164. As is evident from the graph, the hysteresis curves shift in response to changing strain, generally moving in a positive direction with respect to both the X and Y axes in response to increasing strain. This "shifting" characteristic causes the electrical resistance of the SMA material to change with respect to both temperature and strain.

In one application of the present invention, the SMA material is heated to its austenite start point and then maintained at that temperature. As the strain increases, the electrical resistance of the SMA material at the austenite start point is measured. In FIG. 2, at approximately 450° C., this electrical resistance is 4.78 ohms for 0.12 strain 121, 5.04 ohms for 0.23% strain, and 5.12 ohms for 0.35% strain. In another application of the present invention, the SMA material is heated past its austenite phase transformation point, and then cooled to its martensite start point and maintained at that temperature. As the strain increases, the electrical resistance of the SMA material at the martensite start point is measured, In FIG. 2, at approximately 600° C., this electrical resistance is 4.28 ohms for 0.12% strain 123, 4.43 ohms for 0.23% strain and 4.46 ohms for 0.35% strain. In still another application of the present invention, the SMA material is heated and subsequently cooled through its entire hysteresis curve while maintaining strain substantially constant. The characteristics of the resulting curve are compared to other hysteresis curves in a "look-up" table to determine the value of the average strain being applied to the SMA material.

Figure 3:
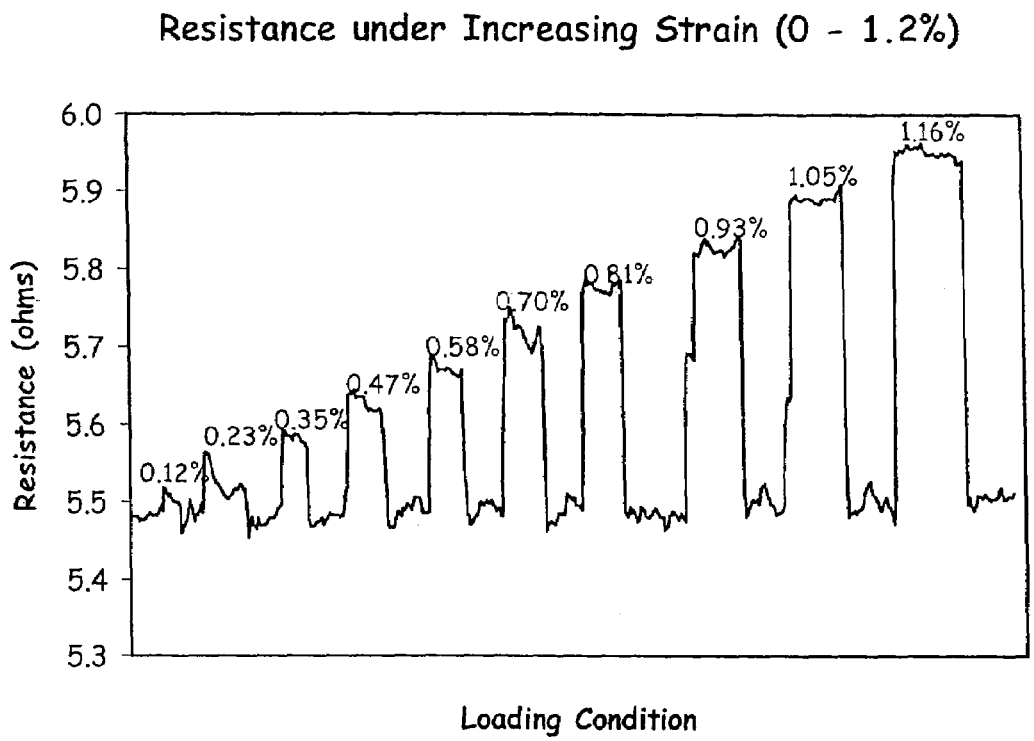
FIG. 3 is a graph of Electrical Resistance vs. Loading Condition for a thin film SMA s material subjected to an increasing strain level from 0-1.2%.

Referring now to FIG. 3, there is shown a graph of Electrical Resistance vs. Loading Condition for a thin film or wire SMA material subjected to an increasing strain level from 0-1.2%. As can be seen from this graph, the electrical resistance of the thin film SMA material increases in a substantially linear manner, from 5.49 ohms to 5.95 ohms, with an increase in the level of strain from 0.12% to 1.16%. Also, it can be seen that the electrical resistance of the material returns to nearly the same value (approximately 5.49 ohms) when the strain is removed. The loading condition corresponds to pressure or force applied to the thin film SMA material which produces the strain thereon.

Figure 4:
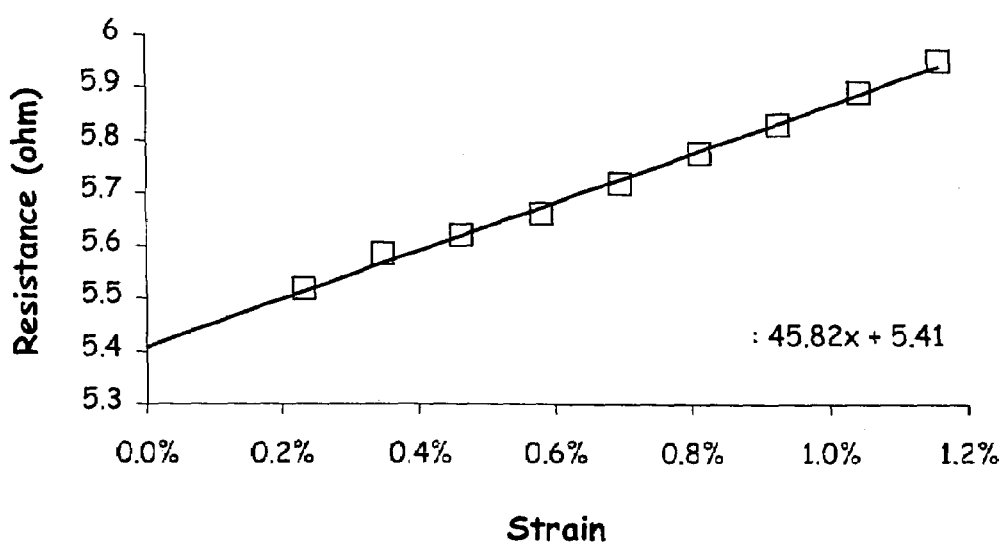
FIG. 4 is a Best Fit Line Graph of Electrical Resistance vs. Strain showing the linear response there between for a thin film SMA material.

FIG. 4 is a Best Fit Line Graph of Electrical Resistance vs. Strain. This graph illustrates the substantially linear response of the thin film or wire SMA material to the application of strain applied thereto. The Best Fit Line is defined by the equation y=45.82x+5.41.

Figure 5:
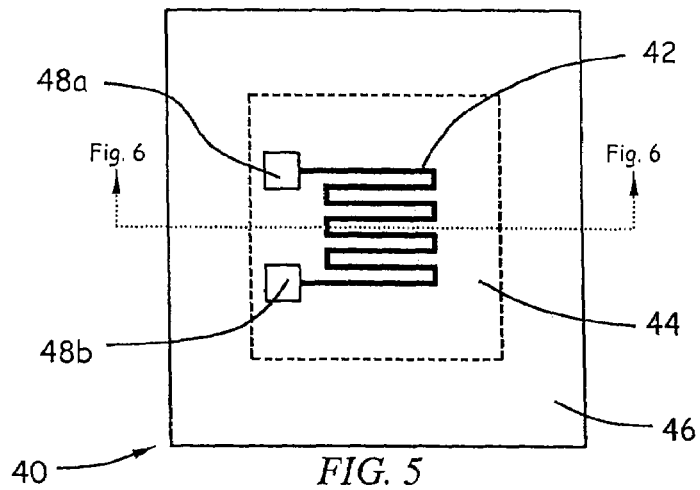
FIG. 5 is a plan view of a thin film SMA material strain sensor.
Figure 6:
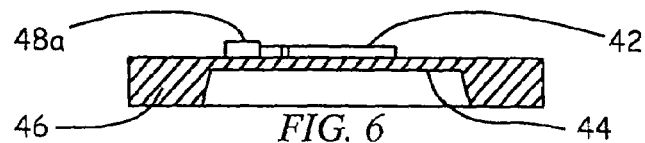
FIG. 6 is a cross-sectional view of a thin film SMA material strain sensor taken across section-indicating lines 6-6 of FIG. 5.
Figure 7:
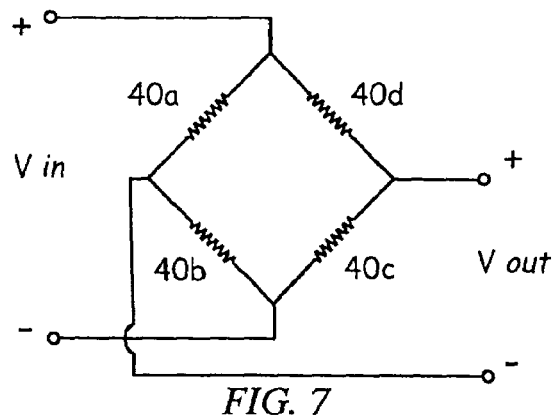
FIG. 7 is an electrical schematic of the SMA material in a Wheatstone Bridge configuration.

Referring now to FIG. 5, there is shown a plan view of a SMA material strain sensor 40. A sensor element 42 formed from thin film TiNi material is deposited over a flexible diaphragm 44 on a substrate 46. Typically, the flexible diaphragm 44 has an area of approximately 1 mm² whereas the substrate 46 has an area of approximately 1 cm². Sensor terminals 48a and 48b provide electrical connection points for leads (not shown) for attachment of the sensor element 42 to external measuring devices or controllers. When a strain is applied to the flexible diaphragm 44, the sensor element 42 flexes. Since the sensor element 42 is at the martensite/austenite phase transformation temperature, the sensor element 42 readily flexes at the application temperature and exhibits substantially linear electrical resistance vs. strain characteristics. The electrical resistance of the sensor element 42 changes as the strain applied thereto increases. The electrical resistance of the sensor element 42 can be transmitted through the sensor terminals 48a and 48b to external measuring devices or controllers. For example, a change in the electrical resistance of the sensor element 42 can be transformed into a change in the voltage across same. In view of the foregoing, the SMA strain sensor 40 can be utilized in a control circuit where a change in pressure or force is being monitored. An example of such a circuit is illustrated in FIG. 7 which is an electrical schematic of four SMA elements 40a, 40b, 40c, and 40d connected in a Wheatstone Bridge circuit. Because of their electrical resistive characteristics, the SMA elements 40a, 40b, 40c and 40d can be utilized in any Wheatstone Bridge circuit application in which the change in output voltage corresponds to change in strain.

Figure 8:
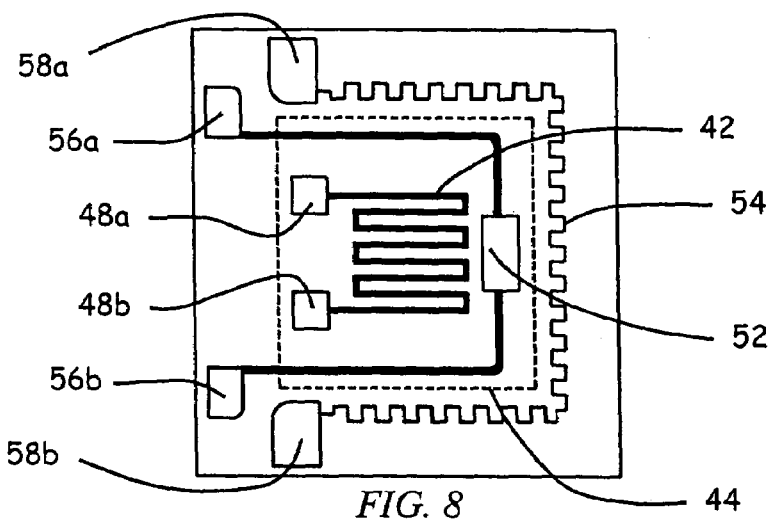
FIG. 8 is a plan view of a thin film SMA material strain sensor including a temperature measuring element and a heating element.

Referring now to FIG. 8, there is shown a plan view of the SMA material strain sensor 40 illustrated in FIG. 4 but further including a temperature measuring element 52 and a heating element 54. The temperature measuring element 52 and heating element 54 are used to ensure that the temperature of the sensor element 42 is maintained at the phase transformation temperature. The temperature measuring element 52 can be any suitable temperature measuring device whereas the heating element 54 can be a resistance heater integrated into the sensor element 42, or can be separate there from. The temperature measuring element 52 is located on or near the flexible diaphragm 44 to provide an accurate measurement of the temperature of the sensor element 42. Typically, the flexible diaphragm 44 is a thin diaphragm resulting in low power consumption and fast thermal response. Temperature terminals 56a and 56b provide a connection between the temperature measuring element 52 and external temperature measuring devices. The heating element 54 is located on the diaphragm 44 to provide a substantially uniform temperature to the sensor element 42. The heating element 54 is also capable of varying the temperature of the sensor element 42 through the phase transformation process. Heater terminals 58a and 58b provide connection between the heater element 54 and an external power source when the environment is cooler than the phase transformation temperature. In this manner, the sensor 40 can be operated above ambient temperature and the sensor operation can be tailored for optimum sensitivity.

Figure 9:
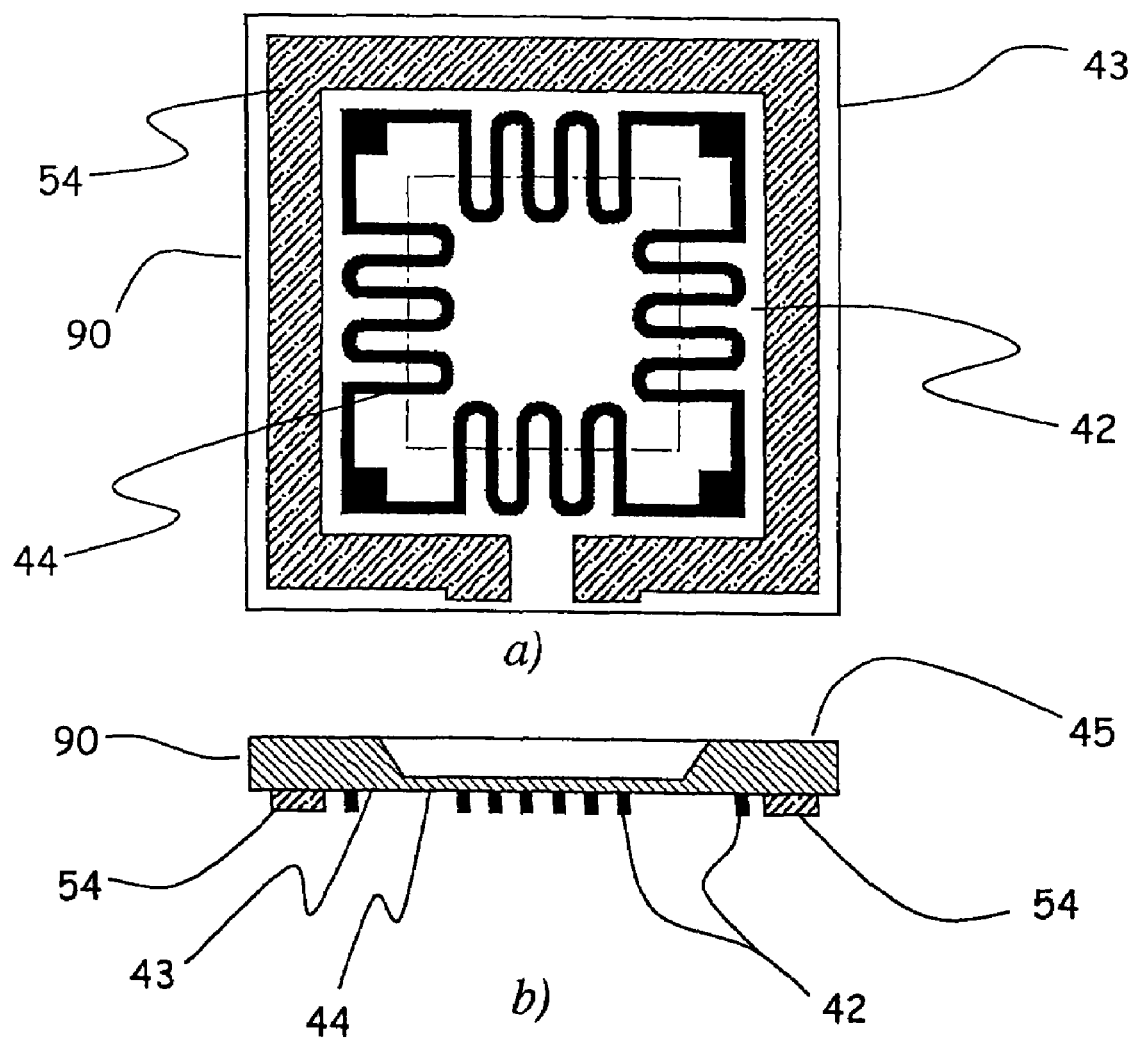
FIG. 9 a) is a plan view of another embodiment of the pressure-sensing element and the heating element incorporated on the same substrate and 9 b) is a cross-sectional view of the same embodiment.

Referring now to FIG. 9 a) and b), in 9 a) there is shown a plan view of another embodiment of the pressure-sensing element 42 and the heating element 54 and in 9 b) is a cross-sectional view. The diaphragm 44 being part of the overall sensor substrate 90. In this particular embodiment, the diaphragm or flexible diaphragm 44, has an upper 43 and a lower 45 surface. The pressure-sensing element 42 and the heating element 54 both, in part, placed on the upper surface 43 of the diaphragm. The heating element 54 is used to ensure that the temperature of the sensor element 42 is maintained at about the temperatures that characterize the phase transformation. The sensor substrate optionally contains a temperature measuring element (not shown), which can be any suitable temperature measuring device whereas the heating element 54 preferably is a resistive heater integrated into the sensor element 42, or can be separate there from. The temperature measuring element (not shown), if used, is preferably located on or near the flexible diaphragm 44 to provide an accurate measurement about the area of the sensor element 42. Typically, the flexible diaphragm 44 is a thin diaphragm resulting in low power consumption and fast thermal response. The heating element 54 is located on the diaphragm 44 to provide a substantially uniform temperature to the sensor element 42. The heating element 54 is also capable of varying the temperature of the sensor element 42 through the phase transformation process. In this manner, the sensor 40 can be operated above ambient temperature and the sensor operation can be tailored for optimum sensitivity.

Figure 10:
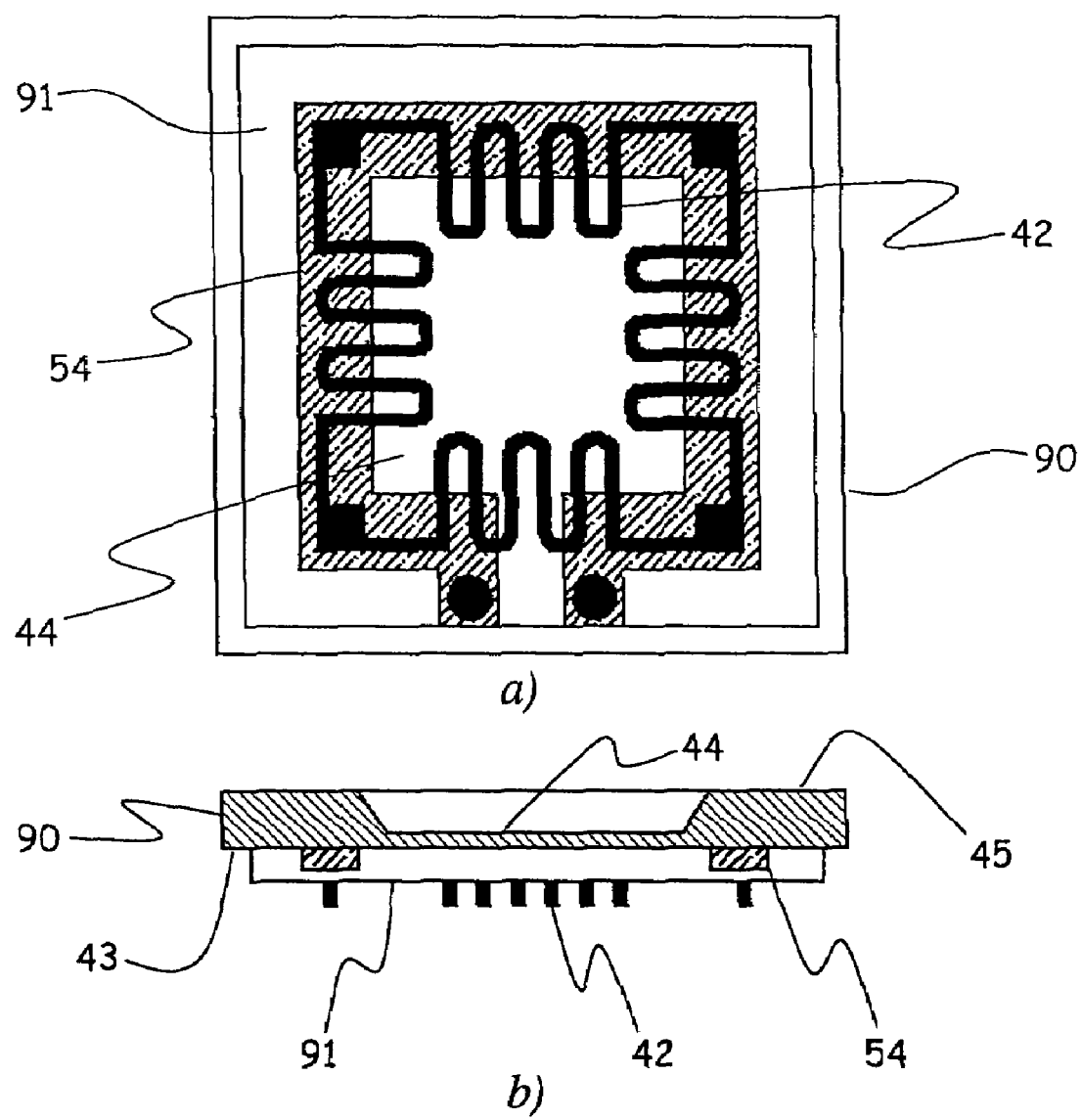
FIG. 10 a) is a plan view of another embodiment of the pressure-sensing element and the heating element incorporated on the same substrate and 10 b) is a cross-sectional view of the same embodiment.

Referring now to FIG. 10 a) and b), in 10 a) there is shown a plan view of another embodiment of the pressure-sensing element 42 and the heating element 54 and in 10 b) is a cross-sectional view. The diaphragm 44 being part of the overall sensor substrate 90. In this particular embodiment, the diaphragm or flexible diaphragm 44, has an upper 43 and a lower 45 surface. In this particular embodiment, the heating element 54 is positioned directly on the upper surface 43 of the sensor substrate 90 over which a dielectric layer 91 is incorporated. The dielectric layer 91 is used to electrically separate the heating element 54 from the pressure-sensing element 42. The pressure-sensing element 42 in this embodiment, in part, overlaps the heating element 54 and is incorporated over the dielectric layer 91. The dielectric layer 91 in this and other embodiments preferably has good thermal conductivity properties. Again, in this embodiment also the heating element 54 is preferably used to ensure that the temperature of the sensor element 42 is maintained at or about the phase transformation temperature. The sensor substrate 90 optionally contains a temperature measuring element (not shown), which can be any suitable temperature measuring device. The heating element 54 preferably is a resistive heater integrated into the sensor element 42, or can be separate there from. The temperature measuring element (not shown), if used, is preferably located on or near the flexible diaphragm 44 and in close proximity to the pressure-sensing element 54 so as to provide an accurate measurement about the area of the sensor element 42. Typically, the flexible diaphragm 44 is a thin diaphragm resulting in low power consumption and fast thermal response. The heating element 54 is preferably located on the diaphragm 44 to provide a substantially uniform temperature to the sensor element 42. The heating element 54 is also capable of varying the temperature of the sensor element 42 through the phase transformation process. In this manner, the sensor 40 can be operated above ambient temperature and the sensor operation can be tailored for optimum sensitivity.

Figure 11:
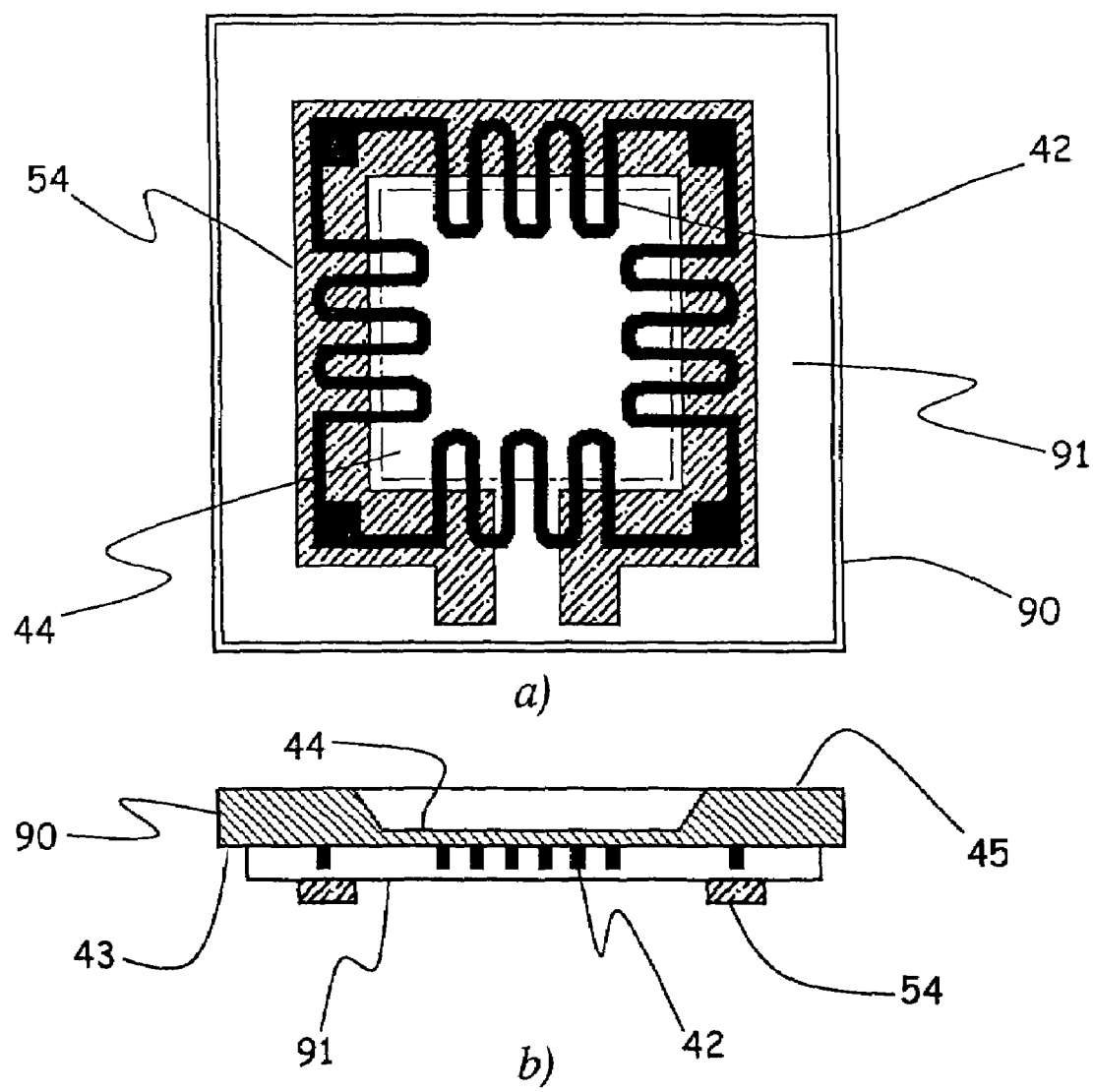
FIG. 11 a) is a plan view of still another embodiment of the pressure-sensing element and the heating element incorporated on the same substrate and 11 b) is a cross-sectional view of the same embodiment.

Referring now to FIGS. 11 *a*) and *b*), in 11 *a*) there is shown a plan view of another embodiment of the pressure-sensing element 42 and the heating element 54 and in 11 *b*) is a cross-sectional view. The diaphragm 44 being part of the overall sensor substrate 90. In this particular embodiment, the sensor substrate 90 and the diaphragm or flexible diaphragm 44, has an upper 43 and a lower 45 surface. In this particular embodiment, a dielectric layer 91 is formed on the upper surface of the sensor substrate 90. The heating element 54 is then positioned in part over the dielectric layer 91. The dielectric layer 91 is used to electrically separate the heating element 54 from the pressure-sensing element 42. The pressure-sensing element 42 in this particular embodiment is applied directly to the top surface 43 of the sensor substrate 90. The dielectric layer 91 in this and other embodiments preferably has good thermal conductivity properties. Again, in this embodiment as well, the heating element 54 is preferably used to ensure that the temperature of the sensor element 42 is maintained at or about the phase transformation temperature. The sensor substrate 90 optionally contains a temperature measuring element (not shown), which can be any suitable temperature measuring device. The heating element 54 preferably is a resistive heater integrated into the sensor element 42, or can be separate there from. The temperature measuring element (not shown) if used is preferably located on or near the flexible diaphragm 44 and in close proximity to the pressure-sensing element 54 so as to provide an accurate measurement about the area of the sensor element 42. Typically, the flexible diaphragm 44 is a thin diaphragm resulting in low power consumption and fast thermal response. The heating element 54 is preferably located on the diaphragm 44 to provide a substantially uniform temperature to the sensor element 42. The heating element 54 is also capable of varying the temperature of the sensor element 42 through the phase transformation process. In this manner, the pressure-sensing element 42 can be operated above ambient temperature and the sensor operation can be tailored for optimum sensitivity.

Figure 12:
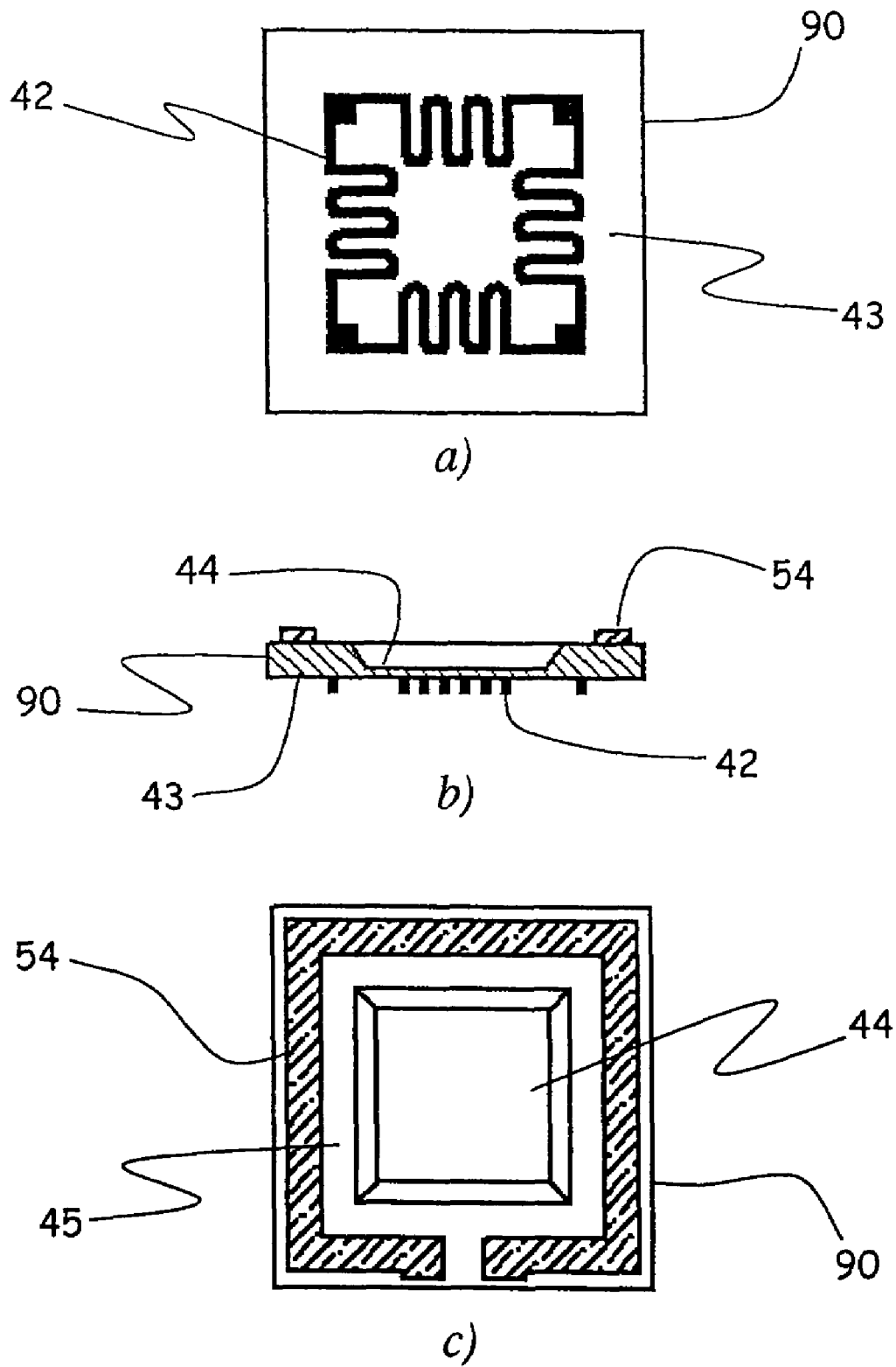
FIG. 12 a) is a plan view of the top surface another embodiment of the pressure-sensing element, 12 b) is a cross-sectional view, and 12 c) is plan view of the bottom surface of the substrate holding the pressure-sensing element.

Referring now to FIGS. 12 *a*), *b*), and *c*), in 12 *a*) there is shown a plan view of the top surface another embodiment of the pressure-sensing element 42, in 12 *b*) is a cross-sectional view, and in 12 *c*) is shown a plan view of the bottom surface of the substrate 90 holding the pressure-sensing element 42. The diaphragm 44 being part of the overall sensor substrate 90. In this particular embodiment, the sensor substrate 90 and the diaphragm or flexible diaphragm 44, has an upper 43 and a lower 45 surface. In this particular embodiment, the pressure-sensing element 42 is located on the top surface 43 of the substrate 90. The heating element 54 is located on the bottom surface 45 of the substrate 90. The pressure-sensing element 42 is separated from the heating element 54 by the substrate, which prevents any electrical short circuiting between the two elements. The substrate in this embodiment preferably has good thermal conductivity properties. Again, in this embodiment also the heating element 54 is preferably used to ensure that the temperature of the sensor element 42 is maintained at or about the phase transformation temperature. The sensor substrate 90 optionally contains a temperature measuring element (not shown), which can be any suitable temperature measuring device. The heating element 54 preferably is a resistive heater integrated into the sensor element 42, or can be separate there from. The temperature measuring element (not shown), if used, is preferably located on or near the flexible diaphragm 44 and in close proximity to the pressure-sensing element 54 so as to provide an accurate measurement about the area of the pressure-sensing element 42. Typically, the flexible diaphragm 44 is a thin diaphragm resulting in low power consumption and fast thermal response. The heating element 54 is preferably located on the diaphragm 44 to provide a substantially uniform temperature to the sensor element 42. The heating element 54 is also capable of varying the temperature of the sensor element 42 through the phase transformation process. In this manner, the pressure-sensing element 42 can be operated above ambient temperature and the sensor operation can be tailored for optimum sensitivity.

Figure 13:
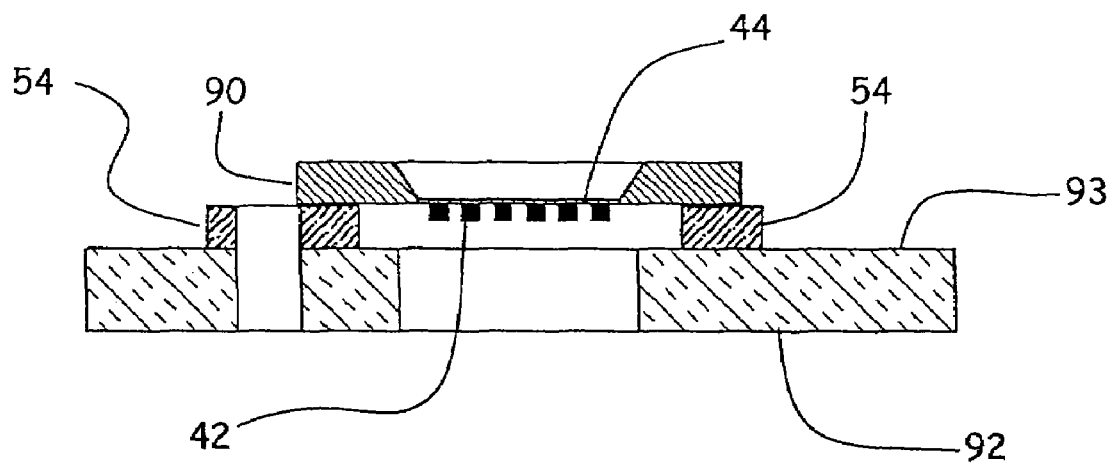
FIG. 13 is a cross-sectional view of an embodiment of the pressure-sensing element and the heating elements incorporated on separate substrates.

Referring now to FIG. 13, there is shown a cross-section of a portion of a pressure sensor where the heating element is not incorporated on the same substrate as the heating element. In FIG. 13, the pressure-sensing element 42 is incorporated on the top surface of the sensor substrate 90. The diaphragm 44 being part of the overall sensor substrate 90. The heating element 54 in this embodiment is incorporated on the lower surface 93 of a separate heater substrate 92. The heater substrate 92 is then packaged with the sensor substrate 90 by placing the heating element 54 onto the top surface 90 of the sensor substrate making sure that the heating element 54 and the pressure-sensing element 42 do not overlap and that there is enough distance between the two elements so that little or no electrical crossover occurs between the elements. The flexible diaphragm 44 is a thin diaphragm resulting in low power consumption and fast thermal response. The heating element 54 is preferably located in close proximity to the diaphragm 44 to provide a substantially uniform temperature to the sensor element 42. The heating element 54 is also capable of varying the temperature of the sensor element 42 through the phase transformation process. In this manner, the pressure-sensing element 42 can be operated above ambient temperature and the sensor operation can be tailored for optimum sensitivity.

Figure 14:
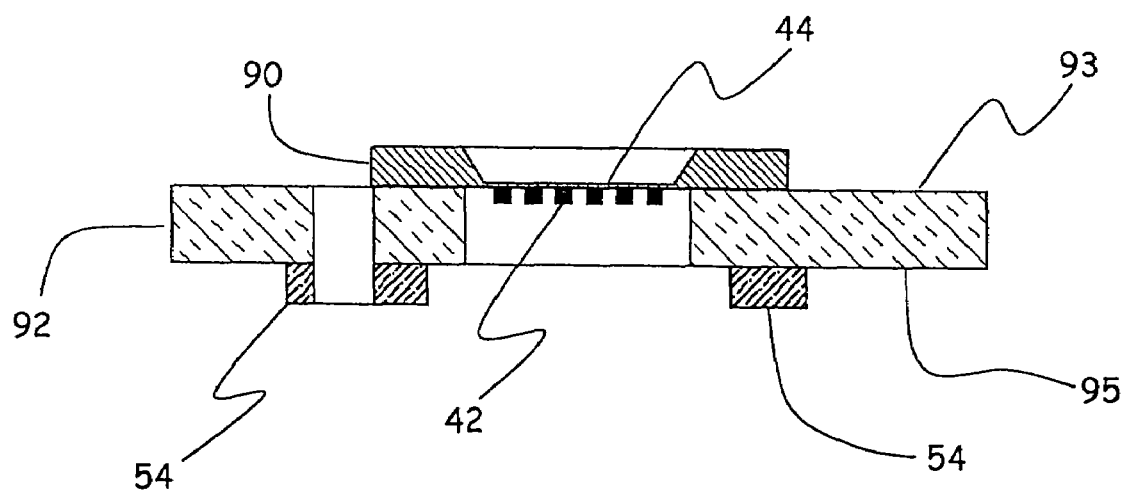
FIG. 14 is a cross-sectional view of another embodiment of the pressure-sensing element and the heating elements incorporated on separate substrates.

Referring now to FIG. 14, there is shown a cross-section of a portion of a pressure sensor where the heating element is not incorporated on the same substrate as the heating element. In FIG. 14, the pressure-sensing element 42 is incorporated on the top surface of the sensor substrate 90. The diaphragm 44 being part of the overall sensor substrate 90. The heating element 54 in this embodiment is incorporated on the upper surface 95 of a separate heater substrate 92. The heater substrate 92 is then packaged with the sensor substrate 90 by placing the lower surface 93 of the heater substrate 92 in contact with the top surface 90 of the sensor substrate making sure that the heating element 54 is in close proximity to the pressure-sensing element 42 to allow low power consumption and fast thermal response with the heating element 54, and providing a substantially uniform temperature to the sensor element 42. The heating element 54 is also capable of varying the temperature of the sensor element 42 through the phase transformation process. In this manner, the pressure-sensing element 42 can be operated above ambient temperature and the sensor operation can be tailored for optimum sensitivity.

Figure 15:
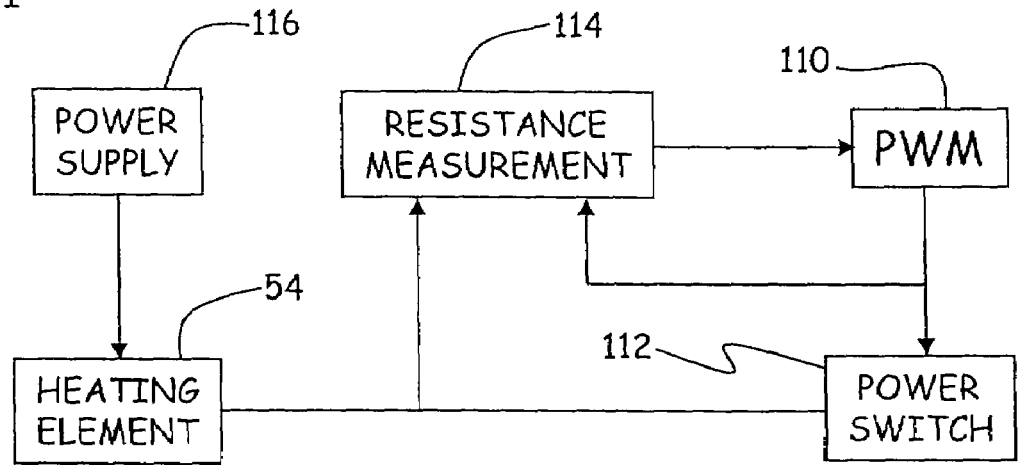
FIG. 15 is a block diagram of one embodiment of the electrical circuitry for operating the temperature control and measurement with the bi-functional sensing element.

Referring now to FIG. 15, there is a block diagram of one embodiment of the electrical circuitry for operating the temperature control and measurement with the bi-functional sensing element. In FIG. 15, the Pulse Width Modulator (PWM) 110 adjusts the duty cycle of the power switch 112 to increase or decrease power from the power supply 116 to the heating element 54. The resistance is measured 114 during the "off" portion of the duty cycle, and this value adjusts the PWM 110 for the next cycle.

Figure 16:
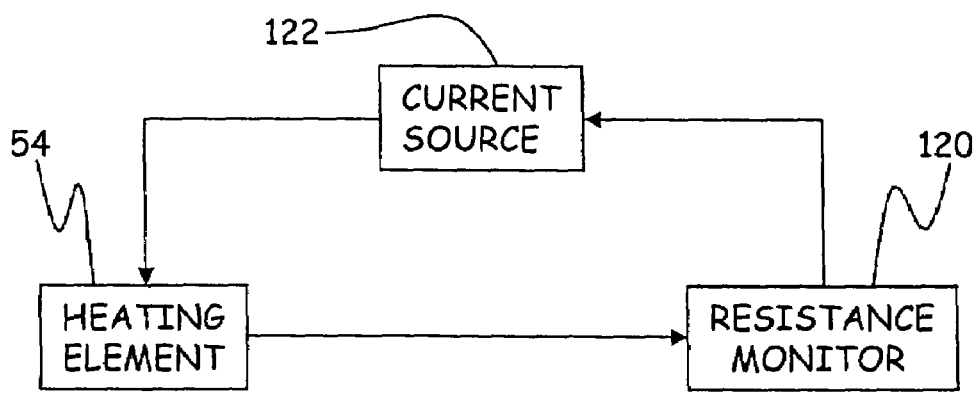
FIG. 16 is a block diagram of another embodiment of the electrical circuitry for operating the temperature control and measurement with the bi-functional sensing element.

Referring now to FIG. 16, there is a block diagram of another embodiment of the electrical circuitry for operating the temperature control and measurement with the bi-functional heating element. In FIG. 16, the resistance monitor 120 continuously measures the heating element 54 for the resistance corresponding to the desired temperature. Deviations above that resistance/temperature point will decrease the current 122 to the heating element 54. The opposite occurs for deviations above the desired resistance/temperature point.

Figure 17:
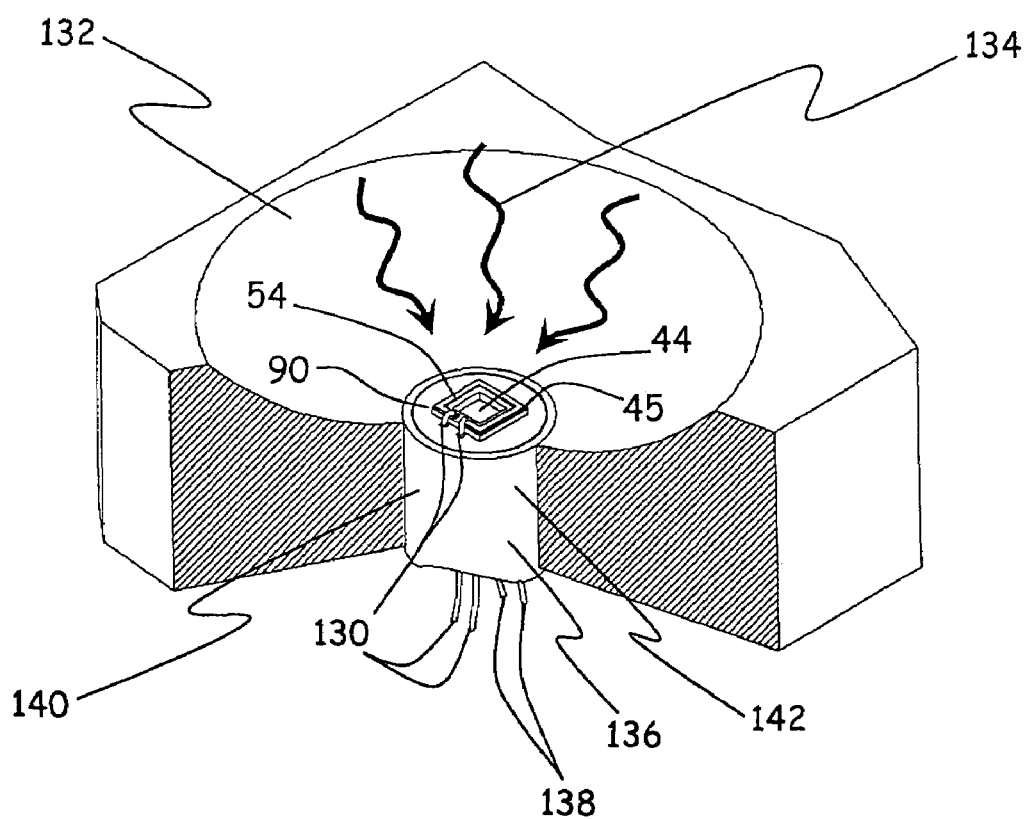
FIG. 17 is a cut-away schematic illustration of a portion of one embodiment of the pressure sensor of the present invention mounted in a pressure chamber where heat flux is into the sensing element from the chamber.

Referring now to FIG. 17, there is a cut away schematic illustration of a portion of the pressure sensor of the present invention mounted in a pressure chamber where heat flux is into the sensing element from the chamber. In FIG. 17, the pressure sensor head 140 is mounted into a pressure chamber 132 so that the lower surface 45 of the sensor substrate 90 is exposed to the inside of the chamber 132. In this particular embodiment, the heating element 54 is mounted on the lower surface 45 of the sensor substrate 90 and the pressure-sensing element (not shown) is mounted on the upper surface (not shown) of the flexible diaphragm 44. Further shown in this Figure are two leads 130 from the heating element 54, which are protected by the packaging sheath 136 of the pressure sensor 142. Additionally, there are leads 138 from the pressure-sensing element (not shown), which are also protected by the packaging sheath 136. The curvy lines 134 represent the heat flux from the pressure chamber 132 into the pressure sensor head 140.

Figure 18:
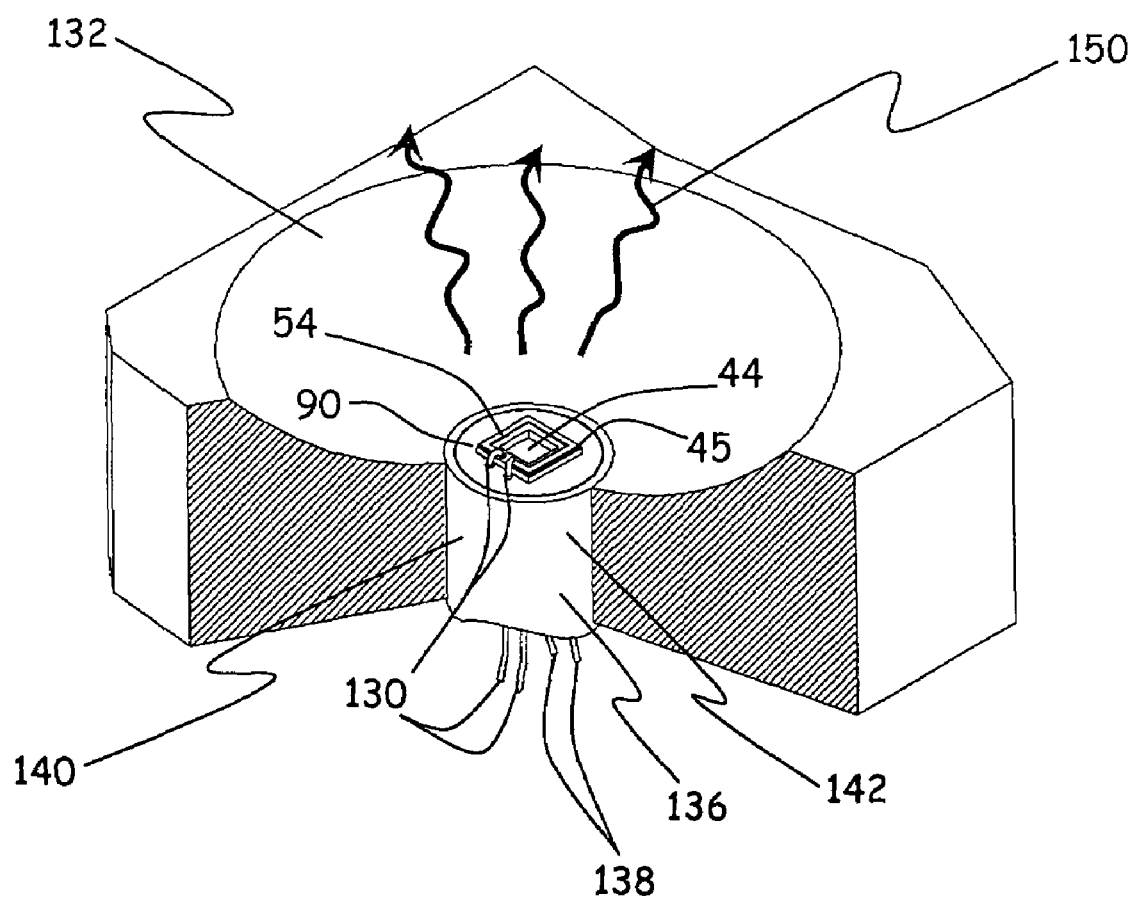
FIG. 18 is a cut-away schematic illustration of a portion of one embodiment of the pressure sensor of the present invention mounted in a pressure chamber where heat flux is into the chamber from the sensing element.

Referring now to FIG. 18, there is a cut away schematic illustration of a portion of the pressure sensor of the present invention mounted in a pressure chamber where heat flux is into the chamber from the sensing element. In FIG. 18, the pressure sensor head 140 is mounted into a pressure chamber 132 so that the lower surface 45 of the sensor substrate 90 is exposed to the inside of the chamber 132. In this particular embodiment, the heating element 54 is mounted on the lower surface 45 of the sensor substrate 90 and the pressure-sensing element (not shown) is mounted on the upper surface (not shown) of the flexible diaphragm 44. Further shown in this Figure are two leads 130 from the heating element 54, which are protected by the packaging sheath 136 of the pressure sensor 142. Additionally, there are leads 138 from the pressure-sensing element (not shown), which are also protected by the packaging sheath 136. The curvy lines 150 represent the heat flux from the pressure chamber 132 into the pressure sensor head 140.

Figure 19:
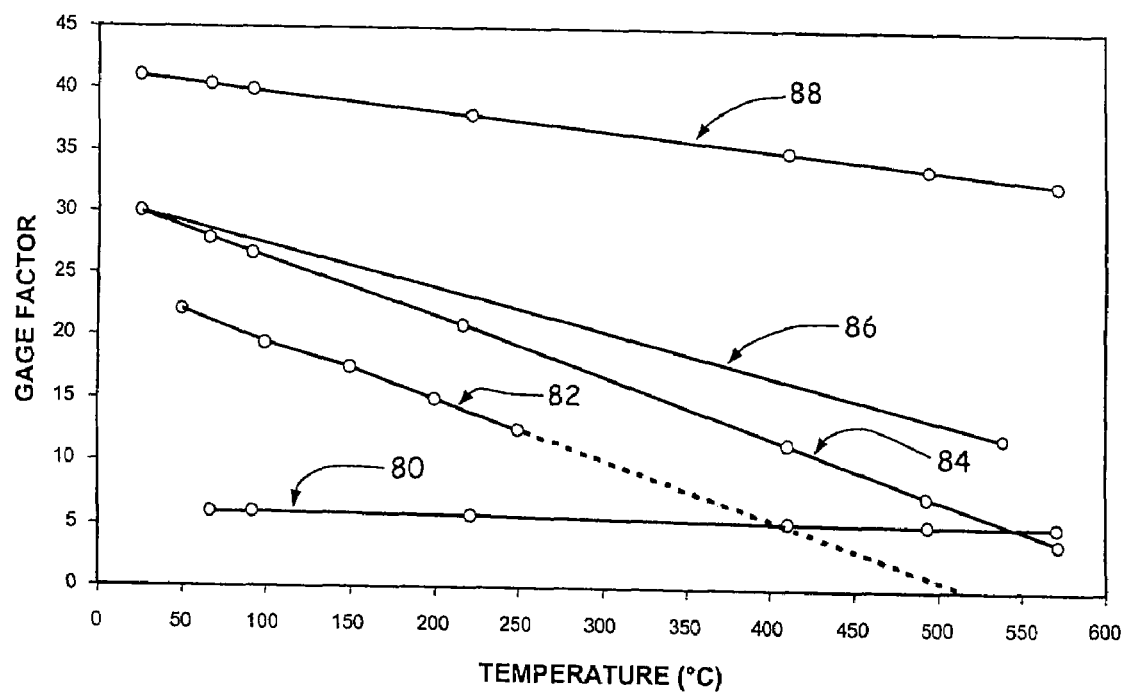
FIG. 19 is a graph comparing the gage factors of other prior art pressure sensors with the pressure sensor of the present invention over a wide temperature range.

Referring now to FIG. 19, there is a graph comparing the gage factors of other prior art pressure sensors with the pressure sensor of the present invention over a wide temperature range. The line 80 in the graph represents the gage factors of metal film strain gage pressure sensors. As can be seen in the graph, metal film pressure sensors have a low gage factor across the entire temperature range of from approximately 50-550° C. The lines 82 and 84 represent n-type and p-type piezoresistive pressure sensors. As can be seen in the graph, these types of pressure sensors can have higher gage factors at the lower temperatures, but the gage factor quickly degrades with increasing temperature becoming lower than that of a metal film pressure sensor at temperatures above 550° C. The line 86 represents a B-silicon carbide pressure sensor. While this pressure sensor exhibits an improved gage factor at elevated temperatures, the gage factor is still very limiting from the aspect of designing the overall sensor. Finally, line 88 represents the pressure sensor of the present invention. This pressure sensor exhibits an excellent gage factor across the entire temperature range and allows for the design of smaller more sensitive pressure sensors.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A pressure sensor comprising:
    a sensing element;
    a diaphragm having an upper and a lower surface; and
    a resistive heating element capable of working as a heating element and a thermistor.

2. The pressure sensor in claim 1, wherein the sensing element is made from a shape memory alloy.

3. The pressure sensor in claim 1, wherein the resistive heating element is capable of maintaining the sensing element at a temperature at or above an application temperature of the pressure sensor.

4. The pressure sensor in claim 3, wherein the application temperature is at least about 200° C.

5. The pressure sensor in claim 3, wherein the application temperature is at least about 400° C.

6. The pressure sensor in claim 4, wherein the pressure sensor has a gauge factor of at least 27 at 200° C.

7. A pressure sensor comprising
    a sensing element;
    a diaphragm having an upper and a lower surface; and
    a resistive heating element
    wherein the resistive heating element maintains the temperature of the sensing element at or above the operating temperature range of the pressure sensor and is used to measure the operating temperature of the pressure sensor.

8. The pressure sensor in claim 7, wherein the sensing element is made from a shape memory alloy.

9. The pressure sensor in claim 7, wherein the application temperature is at least about 200° C.

10. The pressure sensor in claim 7, wherein the application temperature is at least about 400° C.

11. The pressure sensor in claim 9, wherein the pressure sensor has a gauge factor of at least 27 at 200° C.

12. The pressure sensor in claim 10, wherein the pressure sensor has a gauge factor of at least 22 at 400° C.

13. The pressure sensor in claim 7, wherein the pressure sensor is capable of measuring pressures above 1000 psi without premature failure.

14. The pressure sensor in claim 7, wherein the pressure sensor is capable of measuring pressures above 3000 psi without premature failure.

15. A method of controlling a temperature about a pressure-sensing element comprising the steps of:
   providing a pressure-sensing element for an elevated temperature application in which a pressure is to be measured;
   providing a heating element with a power input;
   heating the pressure-sensing element, at least in part, with the heating element;
   determining or estimating the temperature of about the pressure-sensing element by measuring at least one electrical characteristic of the heating element; and
   adjusting the power input to the heating element in response to the measured electrical characteristic or characteristics of the heating element.

16. The method in claim 15, wherein the heating element is capable of heating, at least in part, the pressure sensing element to at least about 200° C.

17. The method in claim 15, wherein the heating element is capable of heating, at least in part, the pressure sensing element to at least about 450° C.

18. The method in claim 15, wherein the pressure-sensing element is manufactured from a shape memory alloy.

19. The method in claim 15, wherein the pressure-sensing element is heated to at or above the application temperature of the pressure sensor.

20. The method in claim 15, wherein the elevated temperature application is measuring the pressure in an engine.

* * * * *